July 19, 1955     T. LOBACHEWSKI     2,713,210
TEMPLATES FOR AND METHOD OF REPAIRING AIRPLANE FABRIC
Filed May 16, 1952     2 Sheets-Sheet 2
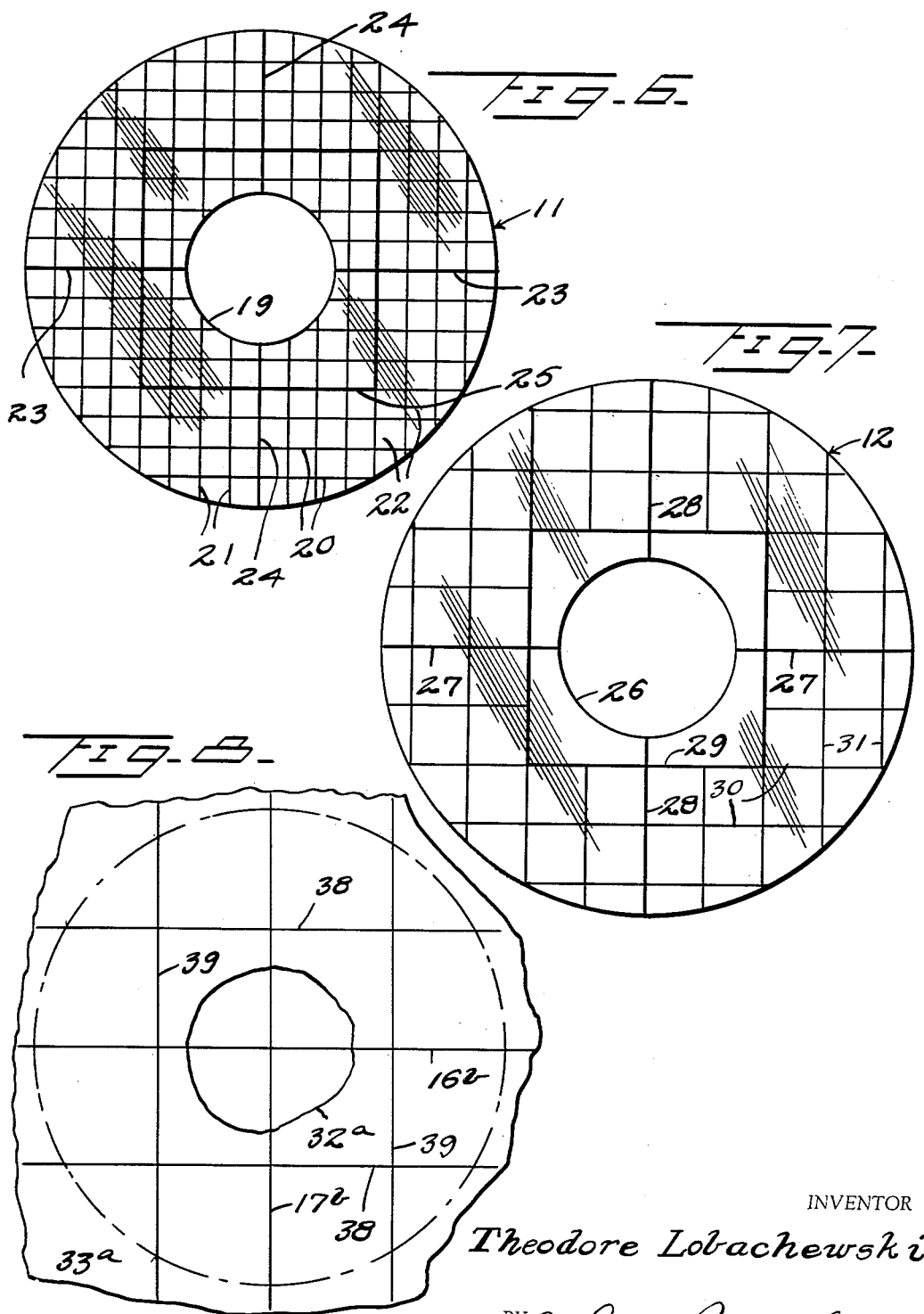

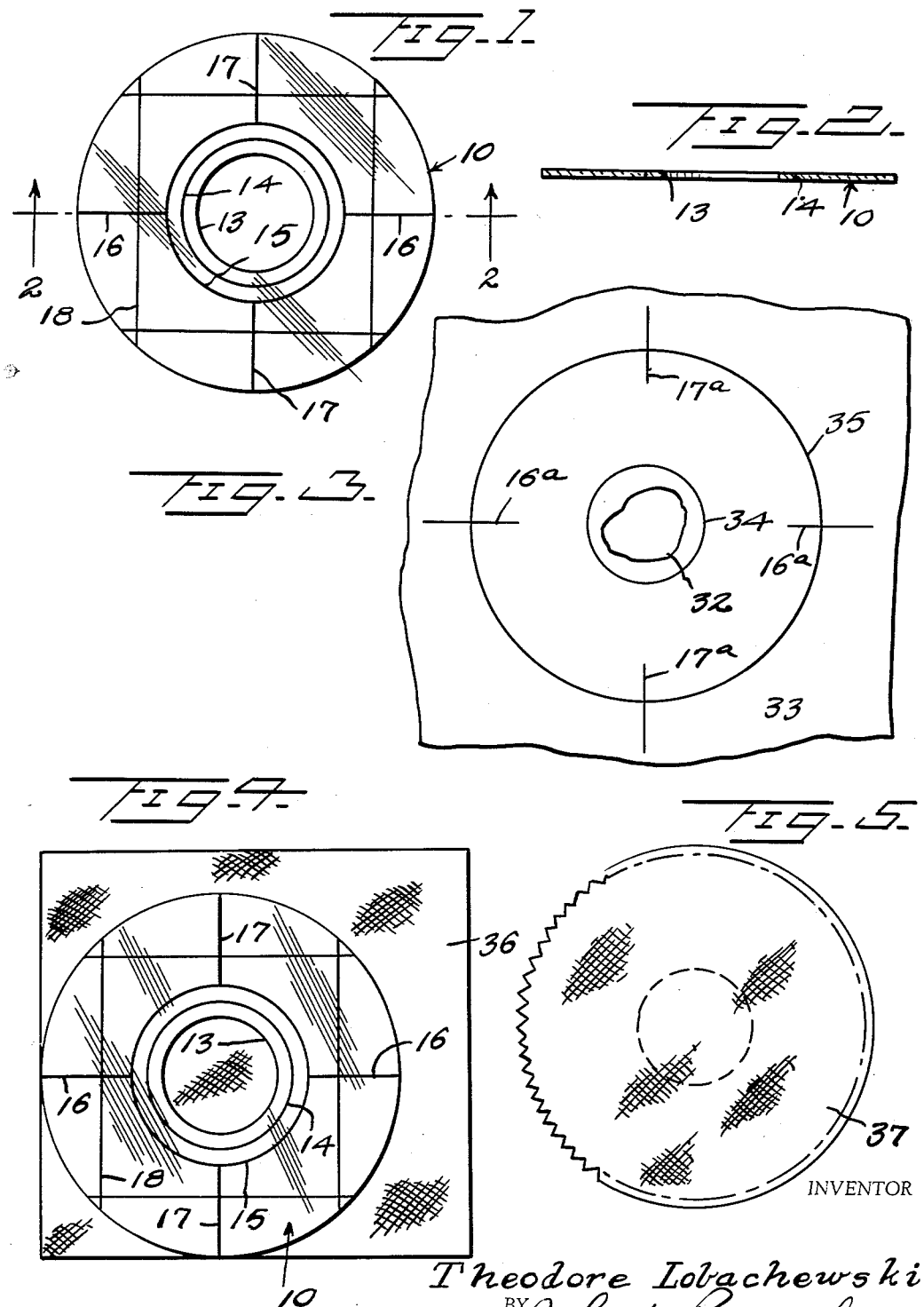

United States Patent Office

2,713,210
Patented July 19, 1955

2,713,210

TEMPLATES FOR AND METHOD OF REPAIRING AIRPLANE FABRIC

Theodore Lobachewski, Brooklyn, N. Y.

Application May 16, 1952, Serial No. 288,357

11 Claims. (Cl. 33—174)

This invention relates to a set of templates for use in connection with repairing holes and other damaged areas of airplane fabric and to materially assist in the proper application of temporary fabric patches which will function effectively until the aircraft can be properly recovered, and which may likewise be utilized to accomplish neat and accurate patching of interiors of aircraft.

Another object of the invention is to provide templates which may likewise be used in connection with the patching of damaged areas of other surfaces or in connection with the fabricating of plywood surface patches on aircraft having plywood covering.

A further object of the invention is to provide templates for use in patching damaged surfaces of aircraft which are capable of being flexed to fit flush against curved surfaces, such as the sides and top of the fuselage and the upper and lower cambers of the wings.

Another object of the invention is to provide templates which are transparent to enable a template to be more readily situated on the airplane fabric and for more readily situating a patch so as not to interfere with protrusions, inspection holes or the like.

Still a further object of the invention is to provide a set of templates wherein the templates have a novel coacting relationship to one another and wherein ordinarily at least two templates are used in accomplishing a patching of a damaged area.

Still a further object of the invention is to provide a set of templates which will materially reduce the time required to patch a damaged aircraft fabric, which will produce a better patching thereof and which will in some cases minimize the amount of materials used.

Various other objects and advantages of the invention will hereinafter become more fully apparent from the following description of the drawings, illustrating a presently preferred embodiment thereof, and wherein:

Figure 1 is a plan view of one of the sets of templates;

Figure 2 is a sectional view thereof taken substantially along a plane as indicated by the line 2—2 of Figure 1;

Figure 3 is a plan view of a portion of a damaged area of an aircraft fabric and illustrating a first step in the use of the template of Figure 1 in connection with laying out the aircraft fabric area surrounding the damaged part preliminary to the application of a patch thereto;

Figure 4 is a plan view showing the template of Figure 1 applied to a piece of fabric for forming a patch of a desired size and shape;

Figure 5 is a plan view of the patch formed with the template;

Figure 6 is a plan view of a second template;

Figure 7 is a plan view of another, third template of the set, and

Figure 8 is a plan view of a damaged portion of an aircraft fabric after the template of Figure 6 has been used to make a layout of the damaged area for the purpose of applying a hand sewn patch.

Referring more specifically to the drawings, for the purpose of illustrating a preferred application and use of the invention, a set of three templates has been illustrated in the drawings including a template, designated generally 10, illustrated in Figures 1, 2 and 4, a template designated generally 11 illustrated in Figure 6, and a template designated generally 12 illustrated in Figure 7. The dimensions which will be given in reference to the templates 10, 11 and 12 are merely for the purpose of illustrating one desired set of dimensions for a particular set of templates and it is to be understood that the size of the templates and the dimensions as hereinafter specified may be varied and will vary considerably.

Each of the templates 10, 11 and 12 preferably comprises a circular disk of approximately one-sixteenth of an inch thickness formed of a material such as Plexiglas, Celluloid or other clear transparent material capable of being flexed. The disk forming the template 10 is preferably three inches in diameter and has a central opening 13 which is one inch in diameter. The template 10 is provided with a colored circle 14 which is one and one-quarter inches in diameter and which is disposed concentrically around the opening 13. The circle 14 is preferably green and the coloring thereof is preferably beneath the top surface of the template. The template 10 is also provided with an outer circle 15 of a contrasting color to the circle 14 which is one and one-half inches in diameter and disposed concentric to said circle 14. The template 10 is provided with horizontal section lines 16 and vertical section lines 17 extending from its outer circle 15 to its periphery. The template 10 is also inscribed with lines forming a square 18 which is two square inches in size. The lines forming the four sides of the square 18 are preferably colored red and each intersects one of the center lines 16 or 17 at a right angle, as clearly illustrated in Figure 1.

The template 11 is preferably four inches in diameter and has a central opening 19 which is one and one-quarter inches in diameter. The template 11 is inscribed with horizontal lines 20 and vertical lines 21 forming one-quarter inch squares 22 between its periphery and the opening 19. The template 11 is also provided with horizontal center lines 23 and vertical center lines 24 extending from the opening 19 to the periphery of the template 11 and which overlie certain of the horizontal lines 20 and vertical lines 21, respectively, and which are heavier or otherwise distinctively designated. The template 11 is also provided with heavy red lines 25 overlying certain of the lines 20 and 21 and intersecting at right angles the horizontal and vertical center lines 23 and 24 and which red lines 25 form a two inch square corresponding to the two inch square 18 and having the center of the template 11 as the center of said square 25.

The template 12, illustrated in Figure 7, is four and one-half inches in diameter and has a central opening 26 which is one and one-half inches in diameter. The template 12 has horizontal center lines 27 and vertical center lines 28 extending from the opening 26 to its periphery and is provided with a two inch square formed by red lines 29 which intersect the center lines 27 and 28 and which are disposed at right angles thereto. The area of the template 12 which surrounds the red square 29 is divided into one-half inch squares formed by horizontal lines 30 and vertical lines 31 in combination with the lines 27, 28 and 29.

Assuming that it is desired to repair a damaged area 32 in a portion 33 of an airplane fabric, the template 10 is placed over the damaged area 32 and after it has been determined that said damaged area falls entirely within the area of the template opening 13, it is thus determined that the template 10 may be used in the layout work for patching the damaged area. With the template 10 placed over the damaged area so that said area 32 is within the template opening 13 and with the horizontal section line 16 disposed as near as possible to the line of flight of the aircraft, the horizontal and vertical center lines 16 and 17, respectively, are marked off at the periphery of the template 10 and the template is then removed and the center lines extended as indicated at 16a and 17a in Figure 3. The template 10 is then replaced using the center lines 16 and 16a and 17 and 17a for re-centering the template. The inner edge of the template 10 defining the opening 13 is then utilized for scribing a circle 34 around the damaged area 32 and the periphery of the template is then used for scribing the outer circle 35. After removing the template 10, a sharp instrument is used to remove the fabric in the area within the inner circle 34 after which old "dope" on the fabric 33 between the circles 34 and 35 is removed, as by first softening with new "dope" and thereafter remove it with a clean rag or putty knife. Since the diameter of the damaged area is not in excess of one inch and as the correct overlap on all sides of one inch can be accomplished by the template 10, said template is placed over a piece of fabric 36, as illustrated in Figure 4, and the fabric 36 is marked off by scribing a circular line around the periphery of the template 10. The fabric 36 is then cut along the circular scribe line, after removal of the template 10, preferably with pinking shears to form a circular patch 37, as illustrated in Figure 5, which is three inches in diameter. The new patch 37, after having "dope" applied thereto is applied over the damaged area 32 and centered with respect to the outer circle 35 so that a one inch overlap in all directions will exist between the damaged area and the outer edge of the patch 37. After the patch has dried sufficiently, it is sanded, re-doped and colored to correspond to the original fabric. In laying off the lines 16a, 17a, 34 and 35, a pencil or other instrument is used which will scribe a color which may be clearly distinguished from the color of the aircraft fabric 33.

Assuming that the damaged area 32 was larger than that illustrated in Figure 3, so that when the template 10 is placed thereover the opening 13 was of insufficient size to completely surround the damaged area. Under such circumstances, the template 10 would merely be employed initially as a selector template to determine which of the templates 11 or 12 should be employed for the layout work and to form the repair patch. Assuming that the damaged area 32 cannot be surrounded by the opening 13 but that it is completely surrounded by the green circle 14, this would indicate that the template 11 should be utilized since the green circle 14 corresponds in size to the opening 19 of template 11. Accordingly, the template 11 will be applied to the damaged area with the opening 19 thereof completely surrounding the damaged area 32, and the various steps previously described in reference to the use of the template 10 would then be followed in preparing the fabric portion 33 around the damaged area and in cutting a patch 37 to be applied thereto. However, it will be noted that the outer circle 35 will be four inches instead of three inches in diameter as formed by the template 11 and the patch will likewise be four inches in diameter to provide a minimum of an inch overlap in all directions. When initially applying the template 10, if the damaged area 32 is found to be of sufficient size so that it cannot be completely surrounded by the green circle 14 but may be surrounded by the outer circle 15, the template 12 of Figure 7 is employed since the opening 26 thereof is of the same diameter as the circle 15. The operation previously described in reference to the template 10 is then performed. It will be noted that the inner circle 34 will be one and one-half inches in diameter, the outer circle 35 will be four and one-half inches in diameter and the patch 37 will likewise be four and one-half inches in diameter, so that a minimum overlap of at least one inch in all directions will be provided by the patch.

If it is found that the damaged area cannot be surrounded by a one and one-half inch outer circle 15 of template 10, but may be completely surrounded by the red line two inch square 18, then one of the templates 11 or 12 may be used in laying off and fabricating a hand sewn patch. Such a damaged area 32a is illustrated in Figure 8 on an airplane fabric part in 33a. For preparing the fabric 33a for a hand sewn patch, the template 12 is ordinarily preferred to the template 11 since its fewer lines 30 and 31 affords a clearer vision through the template. Accordingly, assuming that the template 12 has been selected, this template is placed over the airplane fabric part 33a so that the damaged area 32a is entirely surrounded by the red square 29. The center lines 27 and 28 are then marked at the periphery of the template 12, and the template 12 is then removed and the horizontal and vertical center lines 16b and 17b, respectively, are then completed, as seen in Figure 8. The template 12 is then replaced using the center lines 16b and 17b for correctly re-centering the template and the lines 30 and 31 which form extensions of the four sides of the red square 29 are then marked on the fabric 33a at the periphery of the template 12. The horizontally and vertically marked points in the fabric 33a are connected by horizontal and vertical lines 38 and 39, respectively to form a two inch square surrounding the damaged area 32a. This two inch square formed by the lines 38 and 39 and in which the damaged area 32a is located is then cut out with a sharp instrument. A patch is then cut having a half inch overlap on each side of the two inch square and which may be accomplished by laying off the patch by means of the horizontal and vertical lines 30 and 31 which are spaced outwardly one-half inch from the four sides of the red square 29. The new fabric patch, not shown, which is two and one-half inches square, is sewed, "doped," sanded, re-doped and thereafter colored to conform to the original fabric 33a.

The template 11 can be similarly used for laying off and fabricating a hand sewn patch. It will also be obvious that the area to be worked upon can be seen through the template and in each instance the horizontal line is laid off as nearly as possible in alignment with the line of flight of the aircraft.

The templates 11 and 12 may also be used as measuring instruments for measuring and marking the fabric strips or tape to be used for patches by utilizing either the vertical or horizontal center lines in combination with either the vertical lines 21 or 31 or the horizontal lines 20 or 30 for marking off the pieces of tape or fabric in inches or fractions thereof for cutting the fabric into patches of desired sizes. Likewise, one of the center lines may be utilized with a peripheral edge of one of the templates for marking off a piece of fabric for cutting a strip, for example, one and a half inches wide with the use of the template 10, two inches wide by thus using the template 11 or two and one-quarter inches wide by thus using the template 12, these dimensions being in each instance one-half the diameter of the template employed.

Various modifications and changes are contemplated and may obviously be resorted to, without departing from the spirit or scope of the invention as hereinafter defined by the appended claims.

I claim as my invention:

1. A template for use in patching comprising a relatively thin transparent disk adapted to be disposed over a damaged area to be patched, said disk having opaque portions defining center lines intersecting at right angles for centering the template over the damaged area, and said template having means forming a plurality of limiting boundaries spaced different distances from the center of the template including a central opening and opaque portions surrounding said opening and defining outer boundaries of transparent areas of the template which surround the central opening whereby the maximum lengths and widths of the damaged area, visible through the template opening and through said transparent areas, can be accurately determined for determining the necessary size and shape of the repair patch required.

2. A template as in claim 1, said boundary limiting means including a circular boundary designator disposed concentric to the center of the template and a noncircular boundary designator including a plurality of straight sides each spaced an equal distance from the center of the template.

3. A template for use in patching comprising a relatively thin transparent disk adapted to be disposed over a damaged area to be patched having a center opening disposed concentric to the center of said disk and to its periphery, said template being provided with distinctively colored substantially opaque portions forming a square boundary surrounding a transparent area of the disk having a center defined by said opening and centered with respect to the disk, the inner edge of said template defining the marginal edge of said opening forming means for determining the boundaries of a damaged area to be patched and said transparent template area providing means for determining the size of a patch to be applied to the damaged area.

4. A template as in claim 3, said template being capable of being flexed for engagement flush against a curved surface having a damaged area to be patched, and said template being provided with other opaque portions forming horizontal and vertical center lines intersecting at right angles with the sides of the square.

5. A template as in claim 3, said template being provided with other opaque portions forming a plurality of lines intersecting at right angles and forming transparent squares of predetermined sizes for use in determining the size of a patch to be used in patching the damaged area.

6. A template as in claim 5, said multiplicity of squares extending from the center opening of the disk to the periphery thereof.

7. A template as in claim 3, said template being provided with other opaque portions defining a plurality of lines intersecting at right angles and forming transparent squares of predetermined sizes for use in determining the size of a patch to be used in patching the damaged area, said multiplicity of squares extending from the boundary of the distinctively colored square to the periphery of the disk.

8. A template as in claim 3, the distance between the periphery of the template and the portion of the template defining the marginal edge of said center opening representing the required size of the overlap of a patch required to repair a damaged area surrounded by the center opening.

9. A set of templates for use in patching comprising a transparent selector template having a central opening and a plurality of opaque portions forming distinctively marked circles disposed concentrically around said central opening and spaced therefrom and from one another, a portion of said template defining the marginal edge of said central opening and said distinctively marked surrounding circles cooperating to provide concentric transparent template areas forming means for determining the limits of a damaged area to be patched, and additional templates formed of transparent material having openings sized to correspond to the diameters of said distinctively marked concentric circles whereby one of the last mentioned templates having an opening corresponding in size to a circle of the first mentioned template capable of completely surrounding a damaged area may be employed for laying out the damaged area and a repair patch to be applied thereto, the periphery of each of said templates being disposed concentric to the portion of the template defining the marginal edge of its central opening and being disposed a predetermined distance therefrom representing the necessary overlap of a patch required to repair the damaged area whereby the periphery of the template used may be employed for marking off the outer boundary of the patch to be applied and for marking the shape and size of the patch to be cut.

10. The method of preparing a damaged area for repairing consisting of applying a transparent template over a damaged area to be patched for determining the boundaries of the damaged area and the size and shape of a patch required, the step of marking off the surface to be patched around the damaged area thereof by scribing lines on the surface around a central opening of the template and around the periphery thereof for centering the damaged area within the central opening, and the step of applying said template to a piece of fabric for cutting a patch therefrom corresponding to the size and shape of the periphery of the template.

11. The method of preparing a damaged area for patching comprising applying a transparent template over a surface for centering a damaged area thereof visible through the template within a circular boundary defined by distinctively colored lines of the template forming a square, the step of marking a surface around the damaged area at points on the marginal edge of the template forming extensions of the sides of the square, the step of joining the markers by scribed lines on the surfaces after removal of the template to form a scribed square on said surface surrounding the damaged area, the step of reapplying the template in a centered position over the damaged area and of marking other points on the surface designated by lines extending to the marginal edge of the template, the step of scribing lines on the surface joining said last mentioned marks for forming an outer square surrounding the first mentioned square, and the step of utilizing the template for marking a piece of fabric for cutting a patch to correspond in size and shape to the last mentioned square marked on the surface to be patched.

References Cited in the file of this patent

UNITED STATES PATENTS

| Number | Name | Date |
|---|---|---|
| D. 147,743 | Cambron | Oct. 28, 1947 |
| 1,124,531 | Saltzman | Jan. 12, 1915 |
| 1,151,460 | Hatt | Aug. 24, 1915 |
| 1,394,890 | Gault | Oct. 25, 1921 |
| 1,403,677 | Faas | Jan. 17, 1922 |
| 1,742,684 | Bowman | Jan. 7, 1930 |
| 1,780,237 | Leslie | Nov. 4, 1930 |
| 2,065,734 | Pierson | Dec. 29, 1936 |
| 2,085,638 | Collins | June 29, 1937 |
| 2,101,607 | Block | Dec. 7, 1937 |
| 2,140,914 | Kothny | Dec. 20, 1938 |
| 2,264,296 | Clark | Dec. 2, 1941 |
| 2,336,898 | Squire | Dec. 14, 1943 |
| 2,395,215 | Cochrane | Feb. 19, 1946 |
| 2,499,518 | Markham | Mar. 7, 1950 |
| 2,521,087 | Paulus | Sept. 5, 1950 |
| 2,692,425 | Martin | Oct. 26, 1954 |